United States Patent [19]

Aiken et al.

[11] Patent Number: 4,460,954

[45] Date of Patent: Jul. 17, 1984

[54] FERRORESONANT POWER SUPPLY

[75] Inventors: Leroy W. Aiken, Collegeville, Pa.; Elmo E. Moyer, Saratoga Springs, N.Y.

[73] Assignee: Allied Corporation, Morris Township, Morris County, N.J.

[21] Appl. No.: 395,522

[22] Filed: Jul. 6, 1982

[51] Int. Cl.³ .............................................. H02M 7/06
[52] U.S. Cl. ....................................... 363/75; 320/59; 323/309; 336/165
[58] Field of Search .................................... 363/75–77; 323/306, 308, 309; 320/59; 336/165

[56] References Cited

U.S. PATENT DOCUMENTS

3,091,730  5/1963  Schumacher ........................ 363/75
3,112,439  11/1963  Rosin ................................... 323/308
3,843,918  10/1974  Rhyne ................................... 320/59

Primary Examiner—William H. Beha, Jr.
Attorney, Agent, or Firm—James P. DeClercq

[57] ABSTRACT

An improved ferroresonant transformer for a ferroresonant power supply, such as may be used for charging storage batteries, is provided by placing damping means, such as a strip of non-magnetic metallic material in an air gap of such a transformer, thereby eliminating the need for a damping resistor in the circuit of the resonant winding of such a transformer, thereby decreasing the size, weight, and cooling requirements of such a transformer and power supply, and allowing a greater electrical energy efficiency to be obtained.

10 Claims, 7 Drawing Figures

FERRORESONANT POWER SUPPLY

The instant application refers to the field of regulated rectifying power supplies, and in particular to a ferroresonant power supply and an improved transformer for use therein.

BACKGROUND OF THE INVENTION

Ferroresonant power supplies utilize ferroresonant transformers, having a resonating winding in addition to primary and secondary windings. The resonating winding is connected to a resonating capacitor, which forms a tuned circuit with the after-saturation self-inductance of the resonating winding, tuned to a frequency greater than (in practice, about ten times greater) the frequency of the alternating current power applied to the primary winding. The parameters of the resonating winding and that portion of the transformer core around which it is wound are chosen such that magnetic saturation of the core occurs as a result of the accumulation of volt-seconds during a whole interval-length of each half-cycle of the alternating current power.

When alternating current power at a higher than nominal no-load voltage is applied to the primary winding, the charge-discharge pattern of volt-second excitation of the leakage inductance and the accompanying charge-discharge pattern of the capacitance voltage sustains current until the 180° voltage-zero of the primary voltage wave where core-saturation results in the core-section under the resonating winding reaching saturation to cause commutation of the capacitance voltage at (or later than, when loaded) the 180° voltage-zero of the supply voltage wave.

In this instance, the nominal value of primary voltage is defined as that value whose volt-second area producing saturation corresponds to 0.6366 $E_m$ of the applied voltage over the half-cycle interval of 180°.

When alternating current power at a lower than nominal voltage value is applied to the primary winding, there will be a change in the charge-discharge pattern of the volt-second excitation of the leakage inductance, and the accompanying charge-discharge pattern of the capacitance voltage, such that core saturation will again take place at (or after) the 180° voltage-zero of the primary voltage wave, without the need of the capacitance voltage to sustain current up to the 180° point.

Loading of the resonant winding, either by direct connection to the capacitor terminals or by transformer coupling to the resonating winding itself, will cause commutation to occur in a lagging-phase sense (similar to phase control of SCR circuits) relative to the 180° voltage-zero of the primary voltage wave; the more load current demanded, the greater the phase-lag until a point is reached where the interval of charge accumulation by the capacitance is not equal to the discharge required to sustain current through the leakage inductance. Once the current cannot be maintained up to the 180° point where commutation is to occur, the volt-seconds required to saturate the core cannot be maintained at that voltage level so the circuit reverts to a state of operation at supply frequency at such reduced capacitance voltage levels that the volt-seconds of the leakage inductance discharge can carry-over beyond the 180° point into the next half-cycle without current discontinuity but with a sequential loss of the d.c. component acquired at snap-in until it becomes a series L-C-R circuit supplied by a.c. with R dominating.

Thus, the constant volt-seconds characteristic of the magnetic circuit of the secondary automatically maintains the average value of the voltage across the secondary winding substantially constant over half-cycle intervals of supply frequency; when the voltage across the primary winding changes, the leakage inductance between primary and secondary absorbing or supplying the difference in voltages of the wave shapes between the essentially sinusoidal primary voltage and the "squarish" secondary voltage so long as the energy levels and the exchange thereof between inductor and capacitor are sufficient to sustain the voltseconds of the magnetic circuit for the half-cycle intervals of the supply frequency against the demands of the connected load.

It is known that the operating curve for a ferroresonant transformer is a generally Z-shaped curve, which inherently has a point of possible instability at an applied voltage slightly lower than normal operating voltage, at light loads. The possiblity of such instability is lesser for transformers built with thin laminations of grain-oriented steel and short air gaps, and greater (and is quite pronounced) for thick laminations of less expensive steel and large airgaps. The possibility seems to increase as airgaps are enlarged to provide a higher short circuit current output from the transformer. Thus, if the voltage of the alternating current power should be slightly low, or should momentarily dip, while the load on the ferroresonant power supply is decreased, the ferroresonant power supply may go into oscillation, called resonant runaway, and destroy itself by overheating. This is a reasonably predictable event when such a ferroresonant power supply is used as a battery charger, since disconnecting the battery being charged suddenly reduces the load on the transformer, in a manner that facilitates oscillation. Conventionally, a damping resistor has been placed in series between the resonating winding and the resonating capacitor to prevent such oscillation. Although effective for the purpose, such resistors necessarily carry all the current that flows in the resonating winding, and thus must be physically large to dissipate energy, and impose a constant energy loss which lowers the overall energy efficiency of the ferroresonant power supply.

SUMMARY OF THE INVENTION

In a ferroresonant transformer and a power supply utilizing it according to the invention, the damping resistor in series with the resonating winding and capacitor may be removed, increasing the efficiency of the power supply and reducing its space and cooling requirements.

Ferroresonant transformers are conventionally provided with one or more air gaps within the magnetic path, to control the coupling between primary and secondary windings thereon. In accordance with the invention, an insulated strip of a nonmagnetic conductive metallic material is interposed in such an air gap(s), and has been found to provide a damping effect which allows the removal of the damping resistor. Thus, the objective of removing the damping resistor without lessening the ferroresonant power supplies' resistance to destructive oscillation may be easily and conveniently accomplished by placing a strip of nonmagnetic or paramagnetic material in an existing air gap(s), without other modification to the transformer, providing an increase in efficiency at a decreased cost.

DETAILED DESCRIPTION OF THE INVENTION

Figure 1:
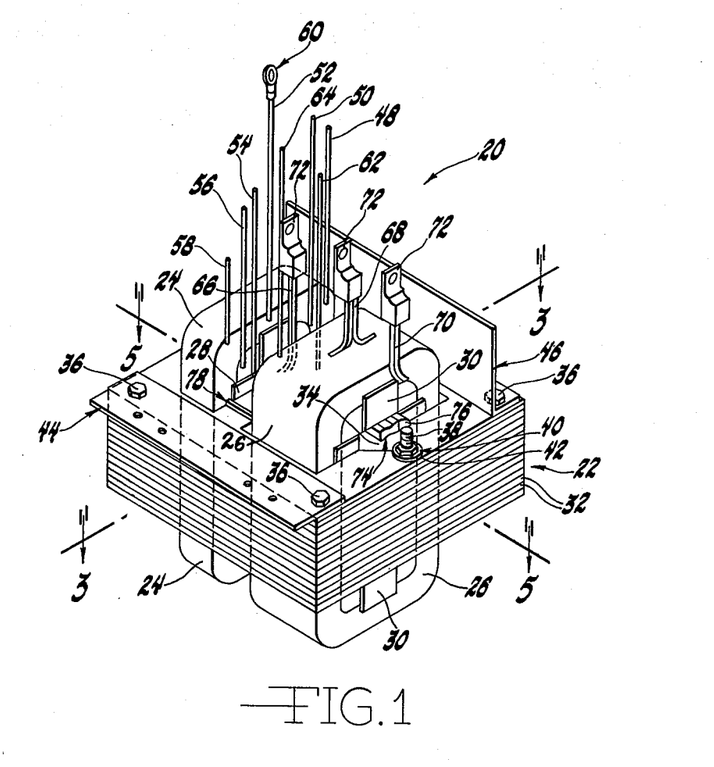
FIG. 1 is a perspective view of a ferroresonant transformer according to the preferred embodiment of the invention.

In FIG. 1, a ferroresonant transformer according to the invention is shown in perspective. As shown, ferroresonant transformer 20 has a laminated core assembly 22, a primary winding assembly 24, and a secondary winding and resonant winding assembly 26. Primary winding assembly 24 includes a primary coil form 28, and winding assembly 26 includes a coil form 30. Laminated core assembly 22 includes a plurality of first laminations 32 and a corresponding plurality of second laminations 34. Core assembly 22 is retained in a stacked relationship by bolts 36 and nuts, not shown, at four corners thereof, as well as by bolts 38. Bolts 38 are provided with washers 40 and nuts 42. Washers 40 serve to allow bolts 38 to clampingly retain both first laminations 32 and second laminations 34.

As shown in FIG. 1, bolts 36 serve to retain brackets 44 and 46. Bracket 44 is preferably used to retain a conventional barrier-type terminal strip, not shown, to facilitate the interconnection of transformer 20, in a conventional manner. Bracket 46 has been provided to support the damping resistor which is eliminated by the present invention. Therefore, bracket 46 serves no present purpose, and may be eliminated, or put to any other convenient use.

In the embodiment shown, primary winding assembly includes terminal leads for two separate windings. As shown in FIG. 1, primary winding assembly 24 includes a first winding start lead 48, a second winding start lead 50, a first winding tap lead 52, a second winding tap lead 54, a first winding finish lead 56 and a second winding finish lead 58. These two tapped windings are provided to allow transformer 20 to be used with a variety of input voltages. In the preferred embodiment, leads 48, 50, 52, 54, 56 and 58 are provided with a terminal such as terminal 60 to facilitate electrical interconnection. Secondary winding and resonant winding assembly 26 includes resonant winding start lead 62, resonant winding finish lead 64, secondary winding start lead 66, secondary winding tap lead 68 and secondary winding finish lead 70. As shown, three lugs 72 are provided, each lug 72 being attached to a respective one of leads 66, 68 and 70. Also as illustrated, blocking such as blocking 74 and 76 is used wherever appropriate, between coil forms 28 and 30 and laminated core assembly 22 to make winding assemblies 24 and 26 immovable with respect to laminated core assembly 22.

A first wedge 78 is shown in position at one end of an air gap, serving to retain one end of an insulated strip of nonmagnetic metallic material. In an actual embodiment, the insulation is provided by separate strips of plastic, and the strip of nonmagnetic metallic material is a single solid strip, although assemblies of groupings of solid, perforated, or solid and perforated strips may also be used to accomplish the objectives of the invention and provide its benefits.

Figure 2:
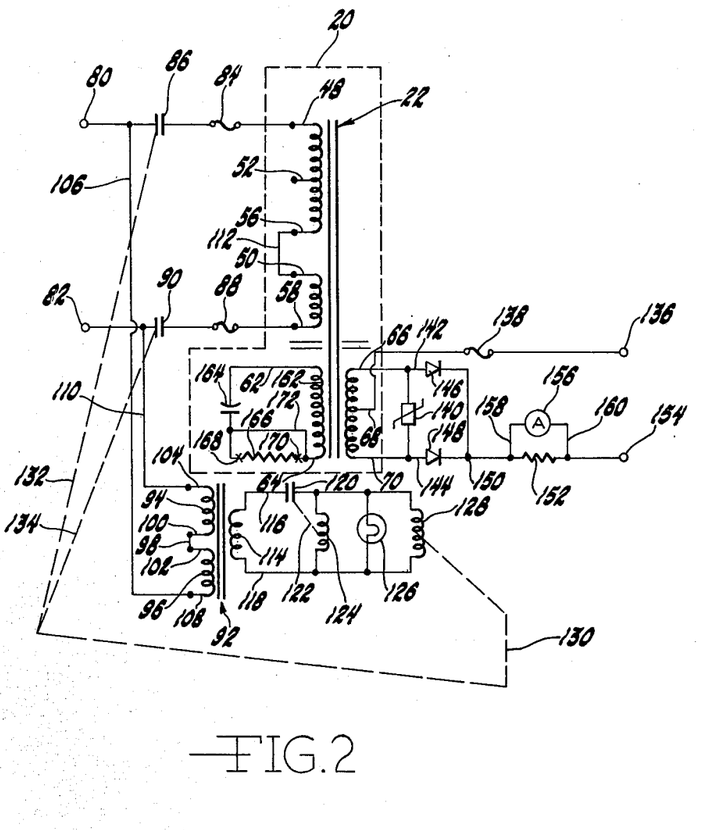
FIG. 2 is a schematic diagram of a power supply utilizable as a battery charger incorporating a ferroresonant transformer according to the invention.

FIG. 2 is a circuit diagram of a power supply for a battery charger for charging motive power batteries, such as those used in material handling equipment, using a transformer 20 in accordance with the invention. The power supply shown in FIG. 2 includes input terminals 80 and 82, for connection to a source of alternating current power. First input terminal 80 is connected to first winding start lead 48 through the series combination of input fuse 84 and first contactor 86. Second input terminal 82 is shown connected to second winding finish lead 58 through the series combination of input fuse 88 and second contactor 90. The power supply of FIG. 2 also includes a low-voltage transformer 92 including a first primary winding 94 and a second primary winding 96. Windings 94 and 96 are shown as placed in a series relationship by jumper 98 joining lead 100 of winding 94 and lead 102 of winding 96. Second input terminal 82 is connected to lead 104 of transformer 92 through line 110 and lead 108 of winding 96 is connected to first input terminal 80 through line 106.

As will be apparent, transformer 92 may be adjusted to provide the desired output voltage over a variety of input voltages, such as 120 VAC, 208 VAC, 240 VAC or 208 VAC, 240 VAC and 480 VAC, by the use of two different winding ratios and appropriate interconnection of leads 100, 102, 104 and 108 with input terminals 80 and 82. Also, ferroresonant transformer 20 may be adjusted to operate with similar nominal input voltages by appropriate interconnections, in conventional fashion, of leads 48, 50, 52, 56 and 58. Leads 56 and 50 are shown connected by a jumper 112, placing both primary windings in series, as would be appropriate for the highest nominal operating voltage.

Transformer 92 includes a low-voltage secondary winding 114 with first and second leads 116 and 118. Voltage appearing between leads 116 and 118 may pass through the manually closable contacts 120 of timer 122 to energize timer motor 124, pilot light 126 and contactor coil 128, which is shown as mechanically linked to first contactor 86 and second contactor 90 through lines 130, 132 and 134.

A negative direct current output 136 of the power supply of FIG. 2 is connected to secondary winding tap lead 68 of transformer 20 through an output fuse 138. Secondary winding start lead 66 and secondary winding finish lead 70 are interconnected by a bidirectional surge protector 140, for preventing the passage of line transients or transients caused by stepwise reduction in a load, such as disconnecting a battery from the power supply of FIG. 2 when it is used as a battery charger, to avoid damaging other portions of the load of the power supply shown in FIG. 2. Also connected to leads 68 and 70 are like poles of rectifiers, illustrated as anodes 142 and 144 of rectifying diodes 146, 148, respectively. Cathodes of diodes 146, 148 are joined together at a point 150, which is connected through ammeter shunt resistor 152 to positive direct current output 154. Of course, a conventional bridge rectifier circuit may also be used, with a noncenter-tapped secondary winding, if desired. An ammeter 156, operatively coupled across shunt resistor 152 by lines 158 and 160 provides a visual indication of the current flowing between positive D.C. output 154 and negative D.C. output 136.

To hold the voltage appearing between outputs 136 and 154 substantially constant when the voltage applied to first input terminal 80 and second input terminal 82 is changed, resonant winding 162 is coordinated to the operating frequency of the alternating current supply by resonant capacitor 164, operatively connected between start lead 62 and finish lead 64. Conventionally, a damping resistor 166 has been provided, such as by being placed in series between capacitor 164 and lead 62 or 64 to assume proper operation of transformer 20. In accordance with the invention, resistor 166 may be removed by disconnecting it at points 168, 170 and providing a jumper or alternate current path, such as by jumper 172, to form an electrical path without discrete resistances between capacitor 164 and winding 162 in a transformer 20 in accordance with the invention since oscillatory behavior is prevented in a more efficient manner.

Figure 3:
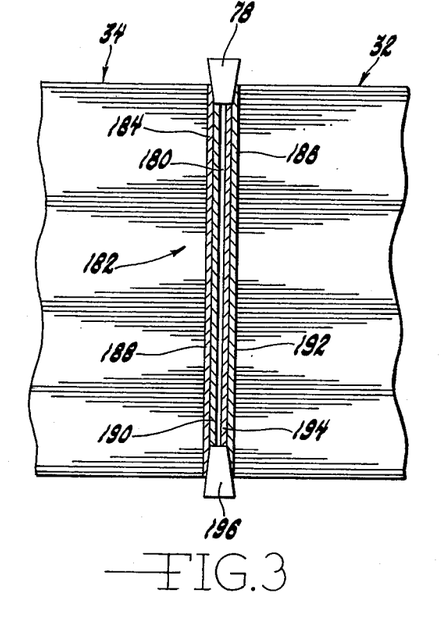
FIG. 3 is a partial sectional view taken along line 3—3 in FIG. 1 showing the preferred configuration of damping means interposed in an air gap.

Referring now to FIG. 3, a detail view of the damping means which allow removal of resistor 166, taken in the direction of line 3—3 in FIG. 1 is shown.

Although only one air gap and damping means is shown, it is preferable that damping means according to the invention be placed in each air gap of a ferroresonant transformer having more than one air gap, since it has been observed that the use of damping means in only one of two air gaps will accomplish the objectives of the invention, but the side of the ferroresonant transformer with the gap that contains damping means according to the invention seems to operate at a higher temperature than the side with an undamped air gap, although this lack of symmetry is not believed to be harmful.

Referring to FIG. 3, an air gap between two sections of stacked laminations such as first laminations 32 and second laminations 34. In accordance with the invention, a strip of conductive material 180 is shown disposed in air gap 182 and insulated from sides 184 and 186 of air gap 182 by insulation layers 188 and 190 adjacent side 184 and 192 and 194 adjacent side 186, with strip 180 being disposed between insulation layers 190 and 194. It should be noted that two layers of insulation are shown as used on each side of strip 180 for convenience in using available materials, since in an actual physical embodiment, a strip 180 having a thickness of 0.040 inches (1.02 mm) was placed in a gap having a width of 0.120 inches (3.05 mm). As shown, strip 180 is lesser in length than the height of the stacked laminations, and retained in position by wedges such as wedges 78 and 196 driven into air gap 182 at opposite ends of strip 180.

Various conductive materials have been interposed experimentally in air gaps such as air gap 182, and found to prevent oscillation. For instance, it was noted that the use of a strip of ferromagnetic material in a fixed air gap would eliminate the oscillatory tendency, but would decrease the short circuit current value or maximum available output of the transformer. The use of nonmagnetic conductive materials does not degrade the short circuit values. Material such as aluminum, couprous materials such as copper and brass, and stainless steel may be used, aluminum being preferred because it seems to allow transformer 20 to operate at the lowest temperature. The strip of conductive material may be a single strip, or a succession of laminated thin strips. Each may be solid or with perforated holes in the direction of the magnetic flux, or it may be a combination of solid and perforated strips. The strip need not encompass the total area of the flux path, and in the interest of mechanical structure and cooling area may extend beyond the magnetic structure, but in any event it should be wedged to prevent motor action from driving it out of the gap. As shown, the strip is inserted in an air gap such as air gap 182 in such a manner that magnetic flux passes from one side to the other side of the thin dimension. The total thickness, or the effective thickness of a perforated strip or of a strip which does not cover the full area of the flux path is not critical, but there appears to be a minimum amount in which damping becomes fully effective. More than an effective amount of damping contributes to unwanted losses.

Figure 4:
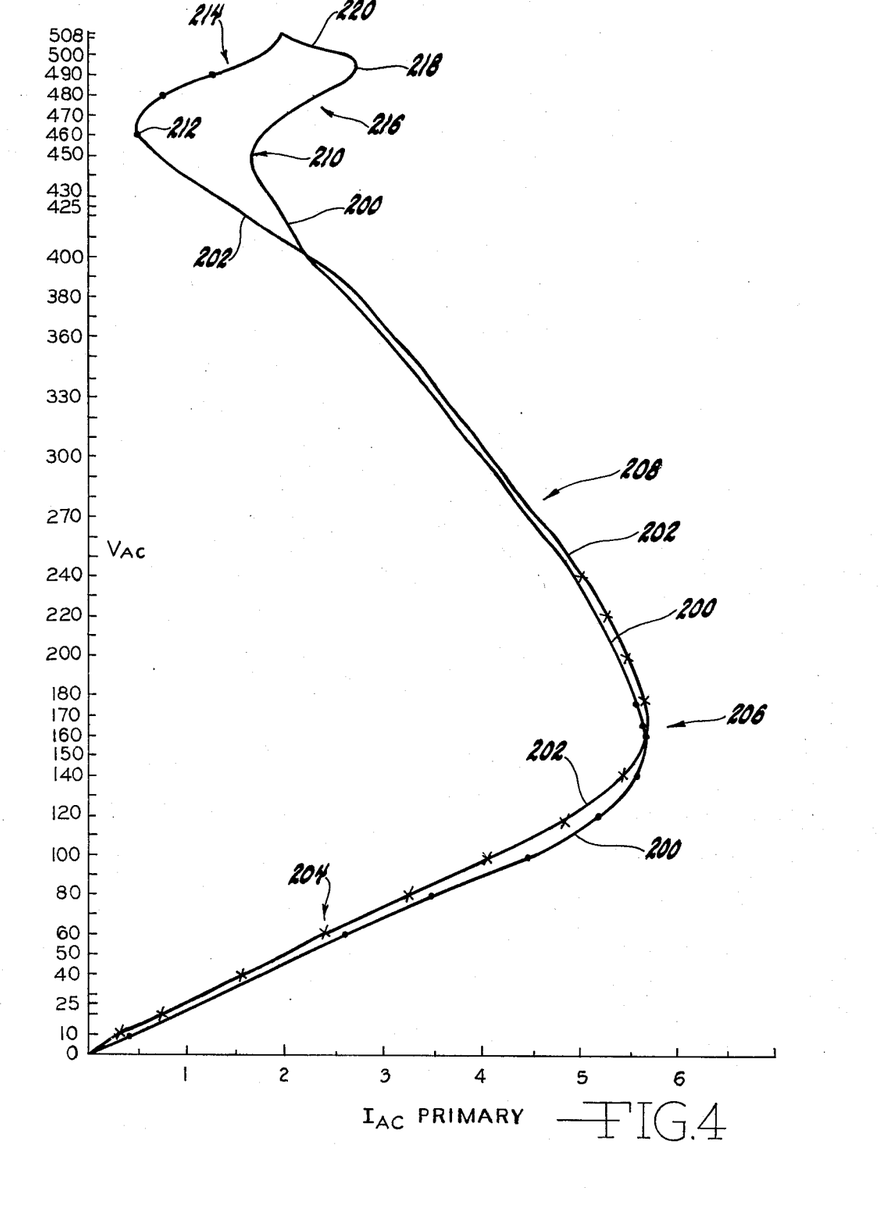
FIG. 4 is a graph showing primary winding characteristics of a conventional ferroresonant transformer and of a ferroresonant transformer according to the invention, at no-load on the secondary load winding supplying the rectifying elements.

Referring now to FIG. 4, a graph of primary current versus primary voltage of ferroresonant transformer 20, without rectifier load applied to the secondary, is shown. FIG. 4 contains two curves, a first curve 200 showing results obtained with a ferroresonant transformer 20 without a damping resistor such as resistor 166, and without damping material in its air gaps, and a second curve 202 showing results obtained with an aluminum strip having a thickness of 0.040 inches (1.02 mm) in the air gaps. As can be seen from FIG. 4, a low voltage region 204, as voltage applied to the primary windings is slowly increased, current flowing through the primary winding also increases until, at a point identified as point 206, and which may be called a snap-in point, current begins to decrease as applied voltage increases. In some ferroresonant transformer designs, this point 206 is a marked discontinuity. Thereafter, in region 208, current decreases as voltage is increased, until a minimum or null current is attained. This occurs at point 210 of curve 200 at a first value of primary current, and, for curve 202, at a point 212 at a second value of primary current which is considerably lower than the first value reached by curve 200.

As voltage was further increased, curve 202 was observed to show an increase in current with an increase in voltage in region 214, while curve 210 was found to first increase, in region 216, then reach a peak at 218 and begin to decrease again in region 220 when it ultimately joins curve 214.

It is believed that, when load is suddenly removed, primary current suddenly decreases, causing an unstable oscillation if there is not a single null in the relationship between primary current and primary voltage around the operating voltage. Experimentally, the amount of conductive material interposed in the air gap or air gaps may be adjusted by adding to the thickness of the strip or strips of material used until the decrease in current with increase in voltage in area 208 is linear or increasing as voltage is increased up until a minimum current or null point. More material than this is believed to result in higher losses and decreased efficiency without any further benefit in decreasing oscillatory behavior.

Figure 5:
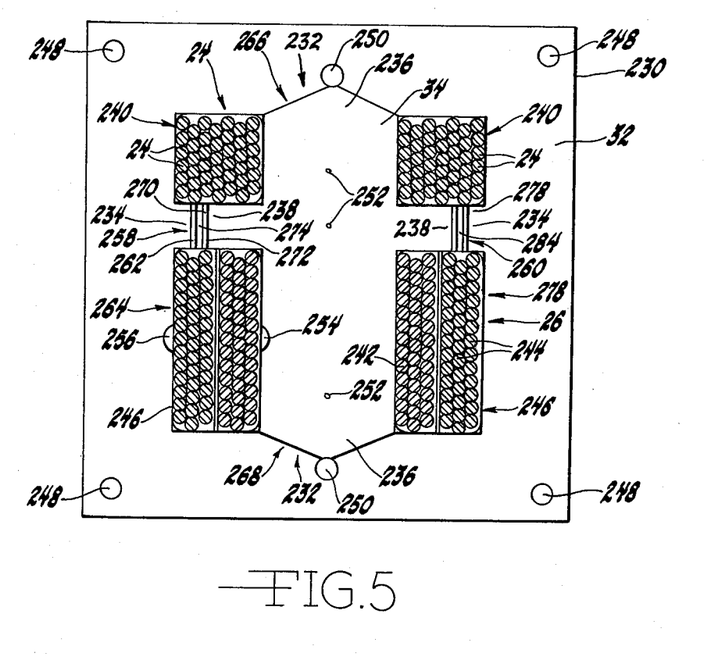
FIG. 5 is a partial sectional view taken along line 5—5 in FIG. 1, showing the lamination arrangement, winding arrangement, and air gaps in a ferroresonant transformer according to the preferred embodiment of the invention.

Turning now to FIG. 5, there is shown a sectional view illustrating the lamination structure and primary, secondary and resonant winding positions, and the location of damping means according to the preferred embodiment of the invention. As shown, first laminations 32 have a generally-rectangular outermost periphery 230, and a generally-rectangular inner periphery, including a V-shaped indentation 232 in two opposed locations, and short inward protrusions 234. As shown, second laminations 34 have a generally cruciform shape, with two opposite ends 236 having a V-shape cooperating with V-shaped indentations 232, and two opposite ends 238 spaced from protrusions 234. Ends 236 are shaped to closely mate with V-shaped indentations 232 in a force fit manner, so that no uncontrollable air gaps occur between ends 236 and indentations 232. In an actual embodiment, opposite ends 238, and corresponding protrusions 234 are nonsymmetrical in length for convenience in proper orientation of laminations 34.

As shown, primary winding assembly 24 is disposed in a first winding-receiving area 240 defined between cruciform first lamination 34 and the generally-rectangular inner periphery of first lamination 32. Secondary winding and resonant winding assembly 26, including a resonant winding 242 and a secondary winding 244 is shown disposed within a second winding-receiving opening 246 defined between cruciform second lamination 34 and the generally-rectangular inner periphery of first lamination 32. The flux paths between primary winding 24 and secondary and resonant windings 242 and 244 are conventional, and will be apparent to one familiar with the transformer arts.

As shown, first laminations 32 are provided with four apertures 248, at the corners thereof, for securing together a stack of such laminations, and apertures 250 at the apexes of V-shaped indentations 232 for the passage of a bolt such as bolt 38, shown in FIG. 1, therethrough with a washer 40 adapted to retain a stack of cruciform laminations 34 within first laminations 32. Cruciform lamination 34 includes, as shown, three small apertures 252, and an arcuate indentation 254. First lamination 32 is provided with an arcuate indentation 256, directly opposite an arcuate indentation 254, across one portion of second winding-receiving opening 246. Apertures 252 and indentations 254 and 256 are used to provide for precise mechanical positioning of laminations 32 and 34 during assembly.

As is conventional, ends 238, opposing short inward protrusions 34, define air gaps 258 and 260 therebetween. Air gaps 258 and 260 heretofore contained insulating portions, wedged in place, to provide mechanical strength in the area of air gaps 258 and 260, so that ends 238 and protrusions 234 would not be free to vibrate in unison with the varying magnetic flux passing through them. In accordance with the invention, an insulated damping means is interposed in at least one of the two air gaps 258, 260, to avoid the necessity for a damping resistor connected to resonant winding 242, such as resistor 166 shown in FIG. 2.

As shown, a first insulating layer 262 is disposed adjacent one short inward protrusion 234 from a third side 264 of the inner periphery of first laminations 32, first and second sides 266 and 268, respectively, being provided with V-shaped indentations 232. A second insulating layer 270 is also disposed in air gap 258, adjacent a third end portion 272 of one of the two ends 238, the damping means according to the invention including a first strip 274 of nonmagnetic metallic material interposed between first and second insulating layers 262 and 270. As stated above, strip 274 may be composed of one or more solid or perforated strips, which need not cover the full area of an air gap, and may extend outside the air gap for mechanical reasons, if desired.

As shown in FIG. 5, second air gap 260 is preferably provided with damping means constructed in the identical manner as the damping means of air gap 258. Specifically, a third insulating layer 276 is disposed in air gap 258 adjacent short inward protrusion 234 of fourth side 278, a fourth insulating layer 280 being interposed in air gap 260 adjacent fourth end portion 282 of an end 238, and a second strip 284 of nonmagnetic metallic material interposed between the third and fourth insulating layers 276, 280.

Preferably, as stated above, damping means in the form of strips of nonmagnetic metallic material should be interposed in both air gaps 258 and 260, although it has been found possible to accomplish the goals of the invention placing a nonmagnetic metallic strip in only one such air gap, although the resultant ferromagnetic transformer operates with uneven temperatures at each air gap. In either case, the damping means is preferably installed as shown in FIG. 3, with the damping means according to the invention being retained by a pair of wedges in each instance; therefore, if damping means in both of two air gaps are provided, there will be two strips of nonmagnetic metallic material insulated from the core laminations, and retained in place by a total of four wedges.

Figure 6:
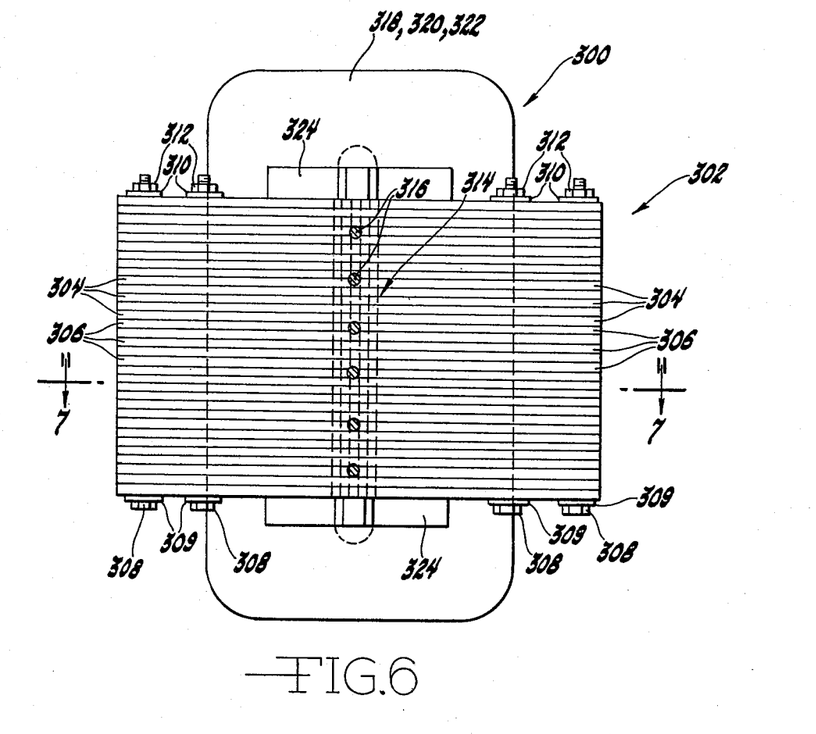
FIG. 6 is a simplified side elevational view of a ferroresonant transformer according to a second less preferred embodiment of the invention.

Referring to FIG. 6, a second ferroresonant transformer 300 is shown. The structure of transformer 300 is not preferred, due to the existence of many random air gaps, which cannot be repeatedly controlled. As shown, laminated core assembly 302 includes a plurality of third E-shaped laminations 304 and fourth I-shaped laminations, alternately stacked to form a generally figure eight-shaped core, maintained in a stacked relationship by bolts 308, washers 309 and 310 and nuts 312. Laminated flux-shunt assemblies 314 are retained in place by set screws 316. Windings such as primary, secondary and resonant windings 318, 320 and 322 respectively are wound on coil forms such as coil form 324, and generally encircle flux shunt members such as member 314.

Figure 7:
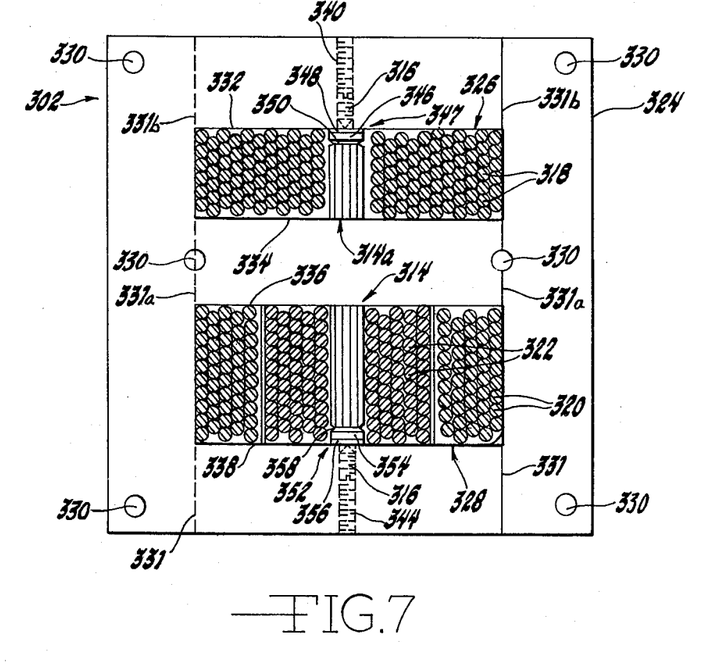
FIG. 7 is a partial sectional view, taken along line 7—7 of FIG. 6, showing the lamination structure, winding arrangement, and air gap arrangement in the ferroresonant transformer of FIG. 6.

A sectional view taken in the direction of 7—7 in FIG. 6 is shown in FIG. 7. As shown, the stacked assembly 302 of laminations 304 and 306 produces a laminated core assembly defining a generally-rectangular outer periphery 324, a first generally-rectangular opening 326 and a second generally-rectangular opening 328. As shown, primary winding 318 is disposed in opening 326, and secondary and resonant windings 320 and 322 are disposed in openings 328.

As can be seen, appropriate apertures 330 are provided to allow the passage of bolts such as bolts 308 for retaining laminated core assembly 302. As can also be seen in FIG. 7, the construction of laminated core assembly 302 is not the preferred construction, due to the unavoidable presence of random-size air gaps at junctions 331, 331a, 331b, between each E-shaped lamination 304 and each I-shaped lamination 306.

To provide a flux path for windings 318, 320, 322, laminated flux shunt members such as members 314 and 314a are disposed in first and second generally-rectangular openings 326 and 328, partially bridging each said opening between first and second longer sides 332 and 334, and 336 and 338, respectively. Conventionally, laminated flux shunt members such as 314, 314a are retained in position by set screws, such as set screws 316 installed in threaded apertures, such as apertures 340, 344, which are made after the assembly of laminated core assemby 302. A piece of insulating material is usually installed between set screws 316 and flux shunt members 314, 314a to distribute the clamping force of the set screws, and to establish an air gap.

In accordance with the invention, this force-distributing insulating piece is replaced with damping means according to the invention, shown as consisting of structure similar to that shown in FIG. 3, but without wedges 78 and 96, since set screws 316 supply the necessary retaining forces. Specifically, a strip 346 of nonmagnetic metallic material is interposed in a gap 347 formed between flux shunt member 314a and side 332, and insulated from side 332 by an insulating layer 348, and insulated from flux shunt member 314a by an insulating layer 350. As stated above, strip 346 may be a solid strip, a perforated strip, a laminated assembly of solid or perforated strips, and may cover an effective area of either lesser than or greater than the area of a gap such as gap 347.

Similarly, a gap 352 shown formed between flux shunt member 314 and side 338 contains a similar strip 354 of nonmagnetic metallic material, which is insulated from side 338 by an insulating layer 356, and insulated from flux shunt member 314 by an insulating layer 358.

Therefore, as will be apparent to one skilled in the art, the advantages and benefits of the invention in eliminating a damping resistor, with attendant increases in possible energy efficiency, may be obtained in any type of ferroresonant transformer, by the novel and simple expedient of inserting a piece of nonmagnetic metallic material into a conventional air gap, so that numerous applications and modifications of the invention will be apparent to one skilled in the art, and may be easily accomplished without departing from the spirit and scope of the invention.

We claim:

1. A ferroresonant power supply, comprising:
   input means for connection to a source of alternating current power;
   ferroresonant transformer means operably connected to said input means;
   rectifying means operably connected to said ferroresonant transformer means for rectifying an electrical output of said ferroresonant transformer;
   said ferroresonant transformer including a primary winding, a secondary winding and a resonating winding, said primary winding being operably connected to said input means, said secondary winding being operably connected to said rectifyng means, said resonant winding being connected to a resonant capacitor;
   said primary winding and said secondary winding and said resonant winding being mounted on a transformer core, said transformer core being provided with damping means for preventing electrical oscillation of said ferroresonant power supply;
   said transformer having an air gap interposed in a flux path thereof;
   said damping means being a strip of nonmagnetic metallic material interposed in said air gap.

2. A ferroresonant power supply according to claim 1, wherein:
   said strip of nonmagnetic metallic material is a strip of aluminum.

3. A ferroresonant power supply according to claim 1, wherein:
   said strip of nonmagnetic metallic material is a strip of a couprous material.

4. A ferroresonant power supply according to claim 1, wherein:
   said strip of nonmagnetic metallic material is a strip of stainless steel.

5. A ferroresonant transformer, comprising:
   a laminated core;
   a primary winding, a secondary winding operably coupled to said secondary winding through said laminated core, and a resonant winding operably coupled to said primary winding and said secondary winding;
   a resonant capacitor being connected in a parallel arrangement with said resonating winding for adapting said resonant winding to a predetermined frequency, said frequency being a frequency of an input signal supplied to said primary winding;
   said resonant winding being adapted to regulate a voltage produced in said secondary winding by causing said laminated core to become saturated at an earlier point in a cycle of said input signal when said input signal supplied to said primary winding is increased;
   said ferroresonant transformer being susceptible to random oscillation;
   said laminated core being provided with damping means to prevent said random oscillation;
   said damping means being a strip of conductive material interposed in a gap defined in said laminated core and insulated from said laminated core by insulating means.

6. A ferroresonant transformer according to claim 5, wherein:
   said laminated core comprises a stacked assembly of first laminations and second laminations;
   said first laminations having a generally-rectangular outermost periphery and an inner periphery having a generally-rectangular shape;
   said second lamination having a generally-cruciform shape having first, second, third and fourth ends, said first and second ends being wedgingly fitted against first and second sides of said inner periphery;
   said third and fourth ends being disposed adjacent third and fourth sides of said inner periphery and defining one said gap between said third end and said third side and defining a second said gap between said fourth end and said fourth side;
   a first insulating layer being disposed in said first gap adjacent said third side, a second insulating layer being disposed in said first gap adjacent said third end, and a first strip of nonmagnetic metallic material being interposed between said first insulating layer and said second insulating layer;
   a third insulating layer being disposed in said second gap adjacent said fourth side, a fourth insulating layer being interposed in said second gap adjacent said fourth end, and a second strip of nonmagnetic metallic material being interposed between said third insulating layer and said fourth insulating layer.

7. A ferroresonant transformer according to claim 6, including:
   first, second, third and fourth wedge means;
   said first and second wedge means being disposed at opposite ends of said first gap for retaining said first strip of nonmagnetic metallic material;
   said third and fourth wedge means being disposed at opposite ends of said first gap for retaining said second strip of nonmagnetic metallic material.

8. A ferroresonant transformer according to claim 5, wherein:
   said laminated core comprises a stacked assembly of third laminations and fourth laminations, said third laminations being E-shaped laminations, and said fourth laminations being I-shaped laminations, said third and fourth laminations being alternately stacked to define a core assembly defining a generally-rectangular outer periphery and a first generally-rectangular opening through said core assembly and a second generally-rectangular opening through said core assembly;
   a first flux shunt member being disposed in said first opening and a second flux shunt member being disposed in said second opening, said first flux shunt member partially bridging said first opening between first and second longer sides thereof and defining a first gap between said shunt member and one of said first and second longer sides, said second flux shunt member partially bridging said second opening between first and second longer sides thereof and defining a second gap between said shunt member and one of said first and second longer sides;
   one said strip of nonferrous conductive material being disposed in said first gap and insulated from the sides of said first gap, and a second said strip of nonmagnetic metallic material being disposed in said second gap and insulated from the sides of said second gap.

9. A ferroresonant transformer according to claim 6, wherein:
   said first and second laminations define a core assembly defining first, second, third and fourth openings therethrough;
   said primary winding passing through said first and second openings, and said secondary winding and said resonating winding passing through said third and fourth openings.

10. A ferroresonant transformer according to claim 8, wherein:
    said first flux shunt member dividing said first opening into first and second winding-receiving openings for receiving said primary winding therethrough;
    said second flux shunt member dividing said second opening into third and fourth winding-receiving openings for receiving said secondary winding and said resonant winding therethrough.

* * * * *